May 12, 1936.  J. BOWEN  2,040,121

SHOCK ABSORBING CASTER

Filed April 10, 1935

INVENTOR
James Bowen.

WITNESS

Patented May 12, 1936

2,040,121

UNITED STATES PATENT OFFICE 2,040,121

SHOCK ABSORBING CASTER

James Bowen, Manheim, Pa., assignor to Charles Bond, Philadelphia, Pa.

Application April 10, 1935, Serial No. 15,557

3 Claims. (Cl. 16—44)

The present invention relates to shock absorbing casters for hand trucks and other vehicles designed for convenient movement from place to place about a factory, mill or the like, the casters being especially useful for trucks employed in the ceramics industries, since these trucks while loaded with the relatively fragile products of such industries are frequently moved over rough or uneven floors or encounter obstacles on the floor while they are being moved, and the resulting shock if transmitted to the load often occasions considerable damage thereto.

Casters embodying my invention are effective to absorb these and similar shocks and prevent their transmission to the truck body and hence to its load, as well as to any parts of the truck itself which may be supported therefrom.

A principal object of the invention, therefore, is the provision of a wheeled caster having shock absorbing properties derived from mechanism permitting yielding relative movement of certain of its parts to thereby compensate for variations in load conditions arising from irregularities in the surface over which it is being moved, from contact with obstacles thereon or through intermittent sudden fluctuations of the load imposed upon the caster from any other cause.

Another object of the invention is the provision of a shock absorbing caster of the character aforesaid in which relative reactionary movement induced by operation of the shock absorbing means is yieldingly compensated for, whereby maximum absorption of shocks transmitted to the caster is effected and their communication through the caster to the superjacent parts inhibited or distinctly minimized.

A further object is the provision of a wheeled caster in which the wheel axle and hence the wheel is mounted for pivotal movement about an axis parallel to the wheel axis but offset therefrom and is yieldingly prevented from such movement under normal conditions.

Other objects, purposes and advantages of the invention will hereinafter more fully appear or will be understood from the following description of certain embodiments thereof wherein reference will be made to the accompanying drawing in which.

In the several figures like characters are used to designate the same parts.

Figure 1:
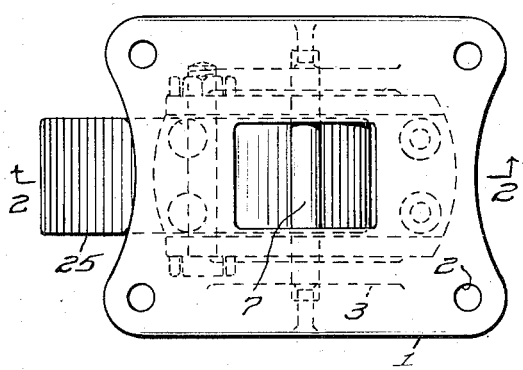
Fig. 1 is a top plan view of one form of caster embodying the invention.
Figure 2:
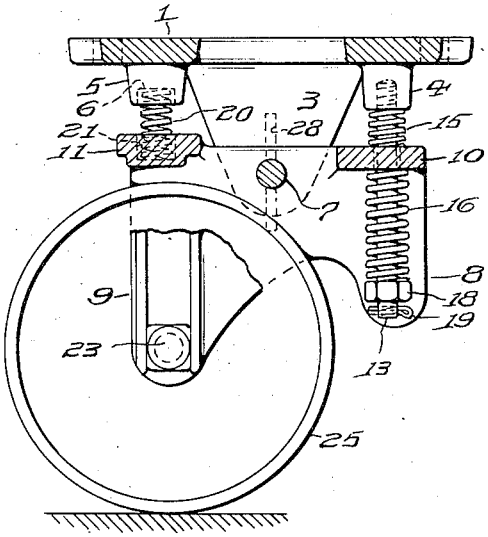
Fig. 2 is a vertical section on the line 2—2 in Fig. 1 with certain parts shown in fragmentary side elevation.
Figure 3:
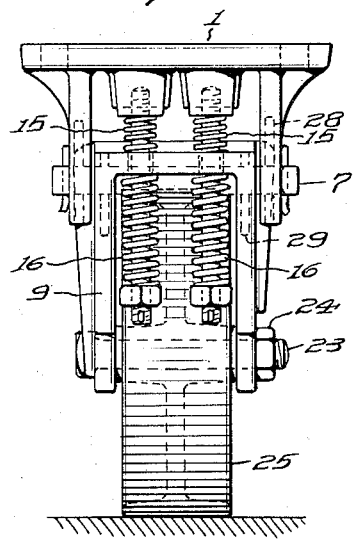
Fig. 3 is an end view thereof looking from the right in the preceding figures.

Referring now more particularly to the drawing, the caster shown in Figs. 1–3, inclusive, comprises a base plate 1 of generally rectangular form having suitable screw holes 2 adjacent its corners to facilitate its attachment to a truck or the like in the usual way. The base plate is desirably made of a single piece of any suitable material and is provided with integral depending lugs 3 disposed in parallel spaced relation between a front pair of internally threaded bosses 4, and a rear pair of bosses 5 comprising spring sockets 6 the purposes of which will hereafter more fully appear.

The lugs 3 are provided with aligned holes adjacent their lower ends for reception of a pivot pin 7 on which a wheel fork 8 is mounted between the lugs for pivotal movement relatively to the plate. This fork is preferably formed of one piece of metal, or other suitable material, and comprises laterally spaced downwardly depending arms 9 having integral stiffening ribs, a front cross plate 10 and a rear cross plate 11, the former being drilled in substantial alignment with the bosses 4 on plate 1 to provide holes for the free passage of studs 13 threaded into said bosses. Interposed between the cross plate 10 and these bosses are a pair of reaction springs 15 surrounding the studs 13 which also support a pair of preferably somewhat longer main springs 16 beneath the plate, and nuts 18 are threaded on the lower ends of the studs to permit adjustment of the tension of these springs, and hence of the force with which they normally bear against the under side of plate 10, in conformity with the load imposed on the caster. Cotter pins 19 may be employed in the usual way to prevent nuts 18 from backing off.

The rear cross plate 11 of the fork is provided with a pair of spaced depressions or sockets 21 aligned with the spring sockets 6 in bosses 5 and cooperative therewith to maintain in proper position a pair of supplemental springs 20 which thus act against the fork in a direction opposite that in which main springs 16 act, but since they are disposed on the opposite side of pivot pin 7 their effect in absorbing shocks is supplemental to that of the main springs which carry the major part of the load.

The depending arms of the fork are drilled to receive a bolt 23 retained in proper position by a nut 24 which serves as an axle for the caster wheel 25, although of course any other suitable means for securing the caster wheel to the fork and/or any desired type of wheel other than that herein shown may be utilized, and while reference has been made to the several pairs of springs which I prefer to employ, it is apparent that one spring, located substantially in the longitudinal central plane of the caster, or any greater number, preferably arranged symmetrically with respect to said plane, may be substituted for each or any pair in accordance with preference or the particular conditions to be encountered by the caster when in use.

I have indicated in the drawing in lugs 3 and fork arms 9 respectively, small closed end bores 28, 29 communicating with the holes provided for reception of fork pivot 7 which when packed with grease or the like afford convenient means for insuring lubrication of this pivot over a long period of time without attention, but it will be understood that any other suitable means adapted for the performance of this function may be employed if preferred.

From the foregoing it will be apparent that the caster shown in Figs. 1–3, inclusive, may be mounted beneath a truck or other vehicle to afford support thereto and permit it to be readily moved about, base plate 1 being rigidly secured in place by screws, bolts or the like and preferably so that the principal direction of movement of the caster will be toward the right in Fig. 2. Under these conditions when the caster wheel enters a depression or encounters an obstruction during movement over the floor or other supporting surface, the fork tends to rotate about its pivot against the force of the main and supplemental springs and transmission of the shock to the base plate and hence to the truck or other object supported by the caster is largely if not entirely prevented. Moreover, when the reactive force of the springs or any other force tends to rotate the fork in the opposite direction, such movement is yieldingly resisted by the reaction springs, and transmission of shock through the caster is likewise prevented or minimized.

Figure 4:
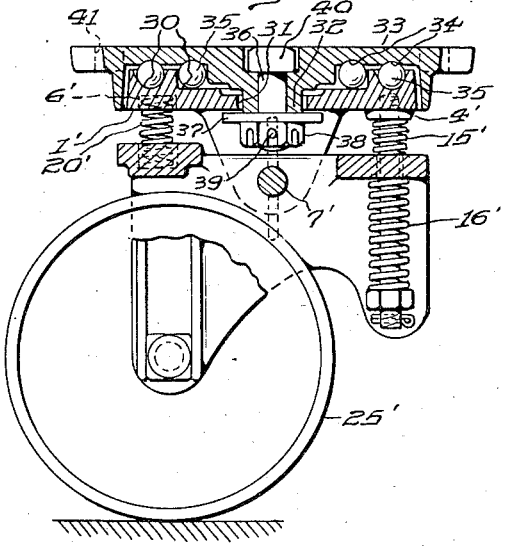
Fig. 4 is a view corresponding to Fig. 2 of another embodiment of the invention showing how it may be employed in a swivel caster of a well known type.

In Fig. 4 I have shown a swivel caster embodying the invention so constructed as to permit the plane of rotation of the caster wheel to automatically adjust itself to the direction of movement of the truck to which it is applied. The base plate 1' in this caster is thus preferably substantially circular in form and comprises a pair of ball bearing races 30 in its upper surface and a central aperture 31 for reception of a boss 32 extending downwardly from the center of a bearing plate 33 designed for securement to the truck. This plate comprises complementary ball bearing races 34, and balls 35 are disposed therein to facilitate relative rotative movement of base plate 1' and bearing plate 33, while a king bolt 36, washer 37, nut 38 and cotter pin 39 maintain the parts in assembled relation, the head 40 of the bolt being countersunk in the bearing plate so that the latter may be seated flush against the under surface of the truck and held thereto by screws extending through holes 41 at its corners or in any other suitable way. In this caster the front bosses on the base plate are shown as considerably shorter than in the caster illustrated in the preceding figures while the rear bosses are omitted entirely and the spring sockets formed directly in the under side of the plate. Otherwise the parts of this caster below the plate are substantially similar to the respectively corresponding parts in the caster shown in Figs. 1–3, inclusive, and are identified therewith by the same numerals with the addition of a prime ('); their construction, arrangement and operation will therefore be readily understood without further description.

It is evident that in both caster forms herein shown and described the tension of the main load carrying springs 16, 16' may be readily adjusted by tightening or loosening their adjusting nuts to accommodate the springs to various loads whereby the range of usefulness of such casters and hence of vehicles on which they are employed is consequently considerably wider than is the case with certain casters which have heretofore been suggested embodying springs intended for absorbing shocks or the like but in which adjustment of the springs is impossible. Such casters when made for light loads cannot therefore satisfactorily be employed for heavy loads, while those designed and intended for heavy loads are not fully effective when burdened with but a relatively light load, whereas the casters of my invention may be readily adapted for either light or heavy loads by a very simple adjustment which can be made while the caster is in place on the vehicle without removal of any parts.

While I have herein described with considerable particularity certain embodiments of my invention as illustrated in the drawing, I do not thereby desire or intend to restrict or confine myself specifically thereto as the principles of the invention may be incorporated in other kinds of casters and changes and modifications in the details of construction and arrangement of the various parts will readily occur to those skilled in the art and may be made if desired, without departing from the spirit and scope of the invention as defined in the appended claims.

Having thus described my invention, I claim and desire to protect by Letters Patent of the United States:

1. In a shock absorbing caster, a base plate having a pair of depending lugs and providing spring and stud sockets oppositely disposed with respect to the lugs, a pivot pin extending through the lugs in substantial parallelism with the plate, a wheel-carrying fork mounted on the pivot pin between the lugs and having a pair of spring sockets respectively in substantial alignment with the plate spring sockets, a spring seating in each pair of aligned sockets, a pair of studs carried in the plate stud sockets and loosely extending through the fork, a spring surrounding each stud between the fork and the plate, another spring surrounding each stud between the fork and the free end of the stud, and means carried by each stud operable to adjust the tension of the adjacent spring.

2. A shock absorbing caster comprising a base plate having a pair of spaced depending parallel lugs with aligned apertures near their lower ends, bosses carried by the base plate on opposite sides of the apertures and between the planes of the lugs respectively providing spring and stud sockets, a wheel-carrying fork disposed between the lugs, a pivot pin extending through the fork and the lug apertures, a spring interposed between the fork and the base plate and seating in the said spring socket, a stud seating in the said stud socket and extending downwardly through the fork, and springs respectively surrounding the stud above and below the fork.

3. A shock absorbing caster comprising a bearing plate, a base plate rotatable relatively thereto about a vertical axis, antifriction means interposed between the plates, means for maintaining the plates in assembled relation, a pair of depending lugs carried by the base plate, a pivot pin extending transversely through the lugs in substantial parallelism with the base plate, a wheel-carrying fork mounted on the pivot pin for pivotal movement thereabout relatively to the lugs and base plate, pairs of springs interposed between the fork and base plate and oppositely disposed with respect to the pivot pin, a pair of studs carried by the base plate extending downwardly therefrom respectively through one pair of springs and through the fork, a spring surrounding each stud on the opposite side of the fork from the base plate, and means for maintaining bearing relation between the respective studs and the last mentioned springs.

JAMES BOWEN.